April 12, 1927.

C. E. PELLOW 1,624,180

CASTELLATING MACHINE

Filed Oct. 2, 1924

5 Sheets-Sheet 1

INVENTOR.
C. E. Pellow
BY
Edward N. Pomelein
ATTORNEY.

April 12, 1927.

C. E. PELLOW 1,624,180

CASTELLATING MACHINE

Filed Oct. 2, 1924

5 Sheets-Sheet 2

INVENTOR.
C. E. Pellow
By
Edward N. Pagelsen
ATTORNEY.

April 12, 1927.  1,624,180
C. E. PELLOW
CASTELLATING MACHINE
Filed Oct. 2, 1924   5 Sheets-Sheet 3

April 12, 1927.                    1,624,180
C. E. PELLOW
CASTELLATING MACHINE
Filed Oct. 2, 1924        5 Sheets-Sheet 4
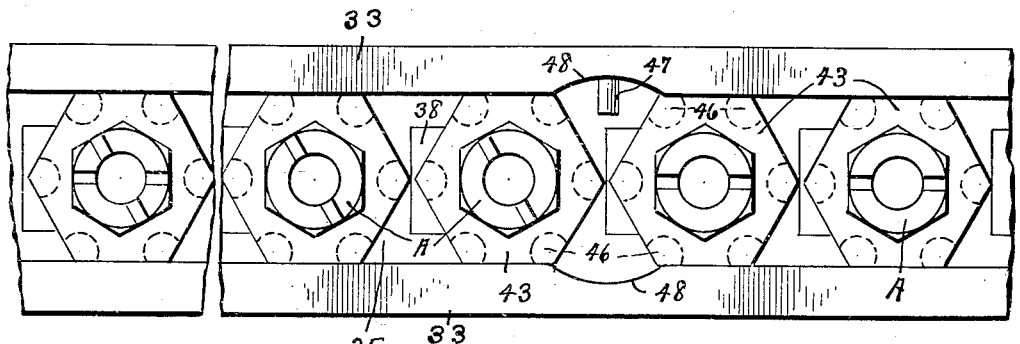
Fig. 4.
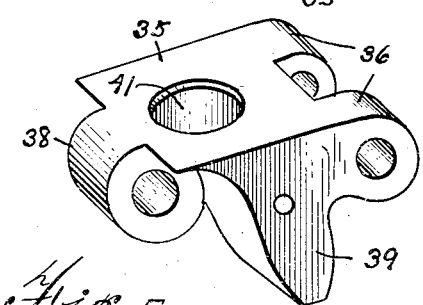
Fig. 5.
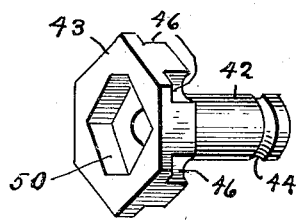
Fig. 6.
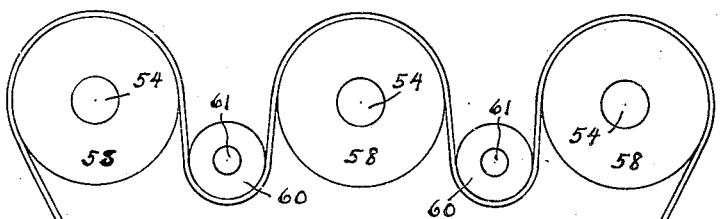
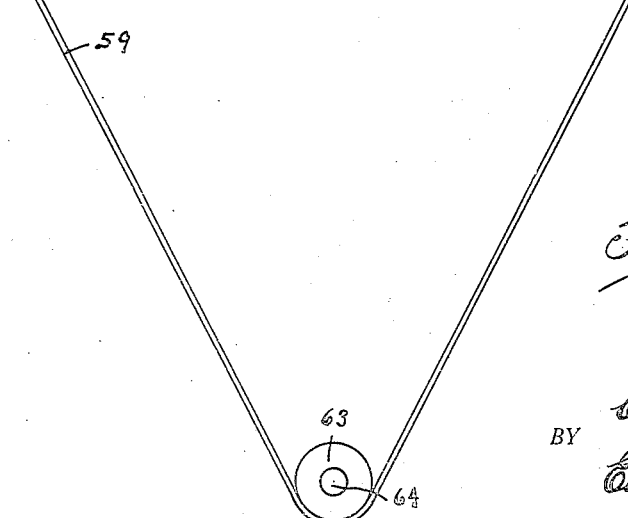
Fig. 7.
INVENTOR.
C. E. Pellow
BY Edward N. Pagelsen
ATTORNEY.

April 12, 1927.
C. E. PELLOW
1,624,180
CASTELLATING MACHINE
Filed Oct. 2, 1924    5 Sheets-Sheet 5
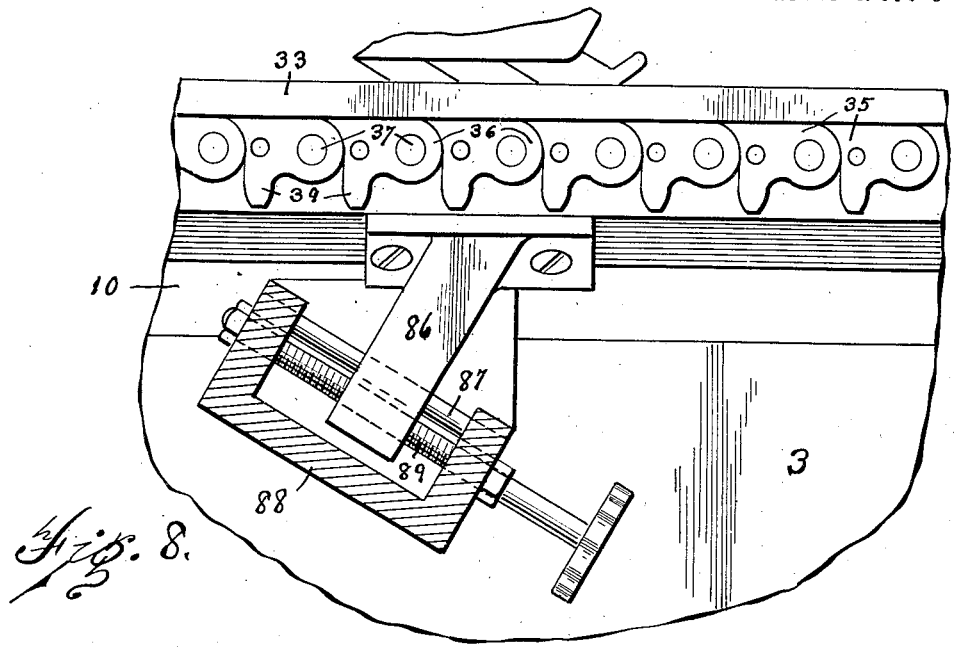
Fig. 8.
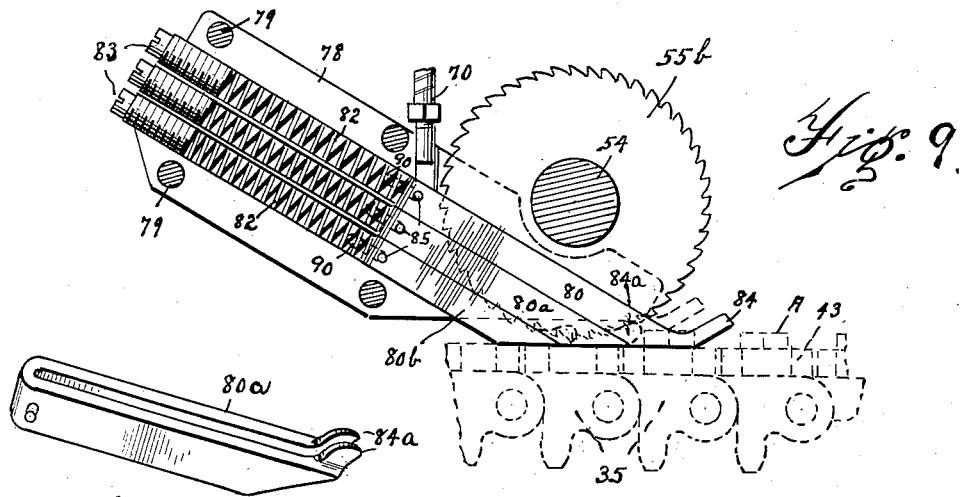
Fig. 9.
Fig. 10.
INVENTOR.
C. E. Pellow
BY
Edward N. Pagelsen
ATTORNEY.

Patented Apr. 12, 1927.

1,624,180

UNITED STATES PATENT OFFICE.

CHARLES E. PELLOW, OF DETROIT, MICHIGAN.

CASTELLATING MACHINE.

Application filed October 2, 1924. Serial No. 741,145.

This invention consists in a machine for cutting grooves across the upper ends of nuts for the purpose of producing recesses to receive cotter pins which extend through diametrical holes in the bolts whereon the nuts are threaded to prevent the nuts from turning after the pins are inserted, and its object is to provide a machine of this character which shall be simple in construction, which shall have large capacity, which may be readily adjusted for nuts of different sizes, and which shall have such ample wearing surfaces as to insure long life.

This invention consists in a bed and a series of saws rotatably mounted thereon, a carrier chain passing along the saws and comprising links provided with rotatable nut carriers, and means to rotate the nut carriers and the nuts therein between the saws.

It further consists in a series of spring held fingers which engage the upper ends of the nuts as they pass below the saws to hold the nuts in their carriers while grooves are being cut across their upper ends.

It also consists in the details of construction illustrated in the accompanying drawings and particularly pointed out in the claims.

Figure 1:
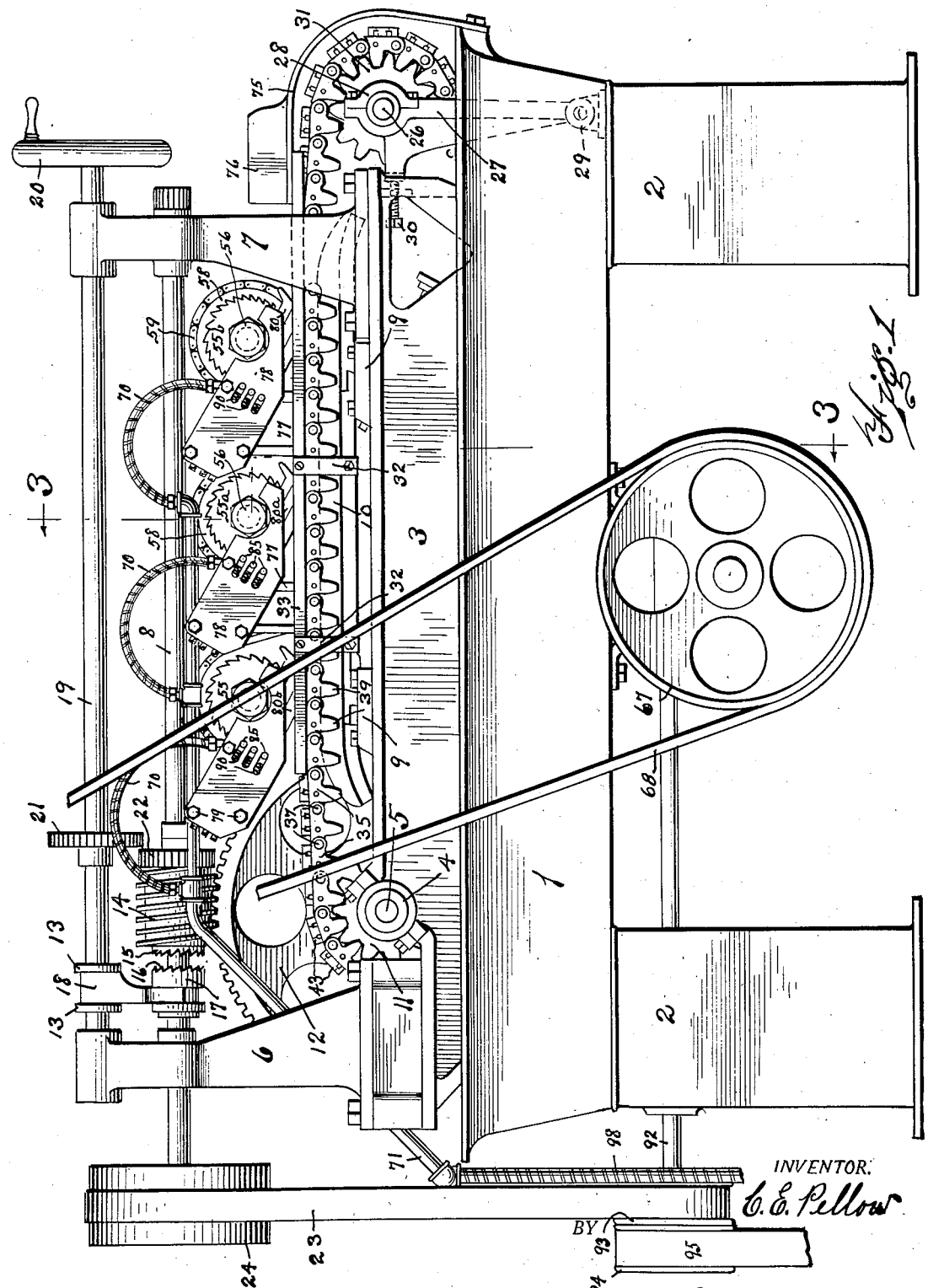
Figure 2:
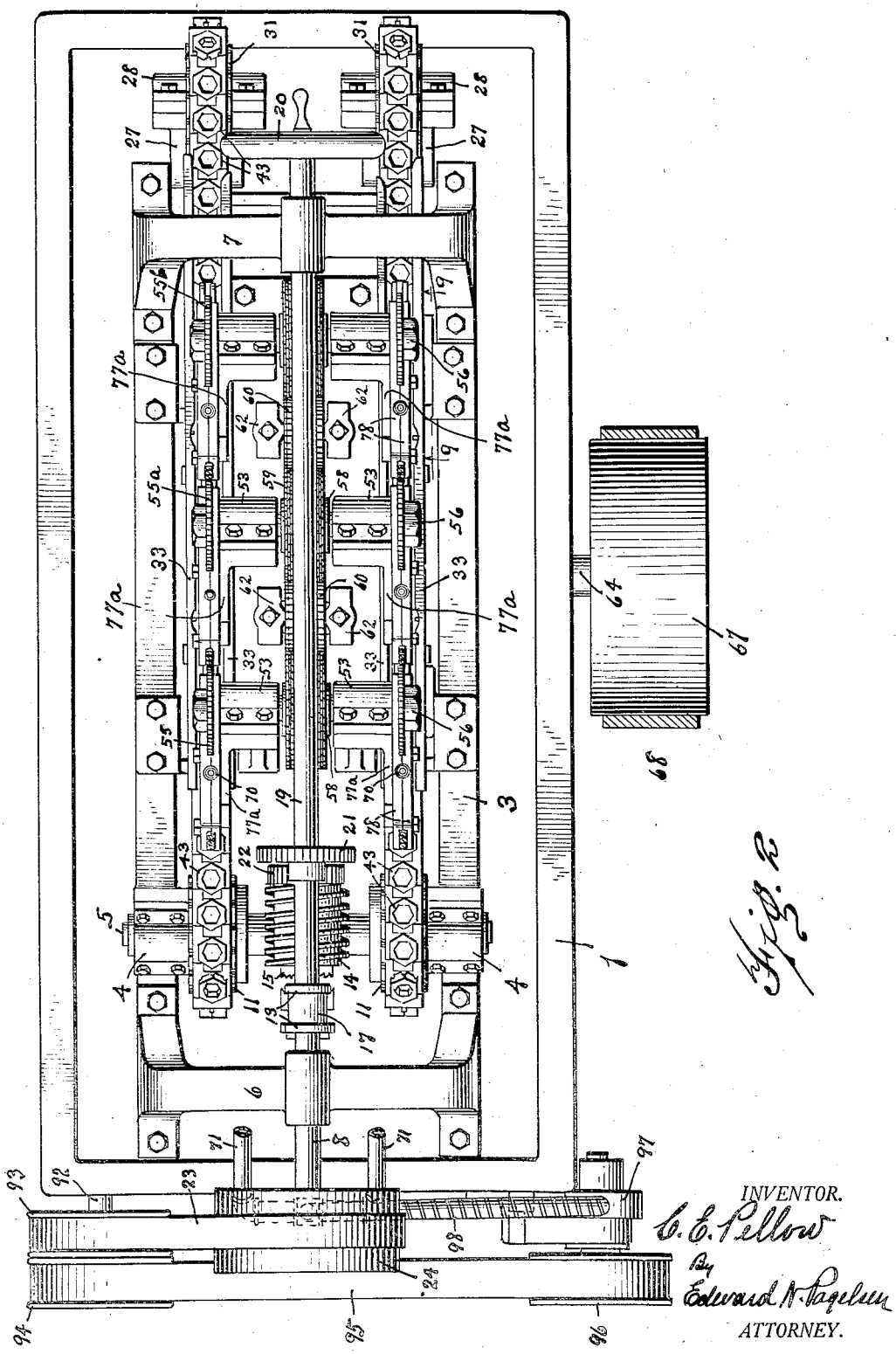
Figure 3:
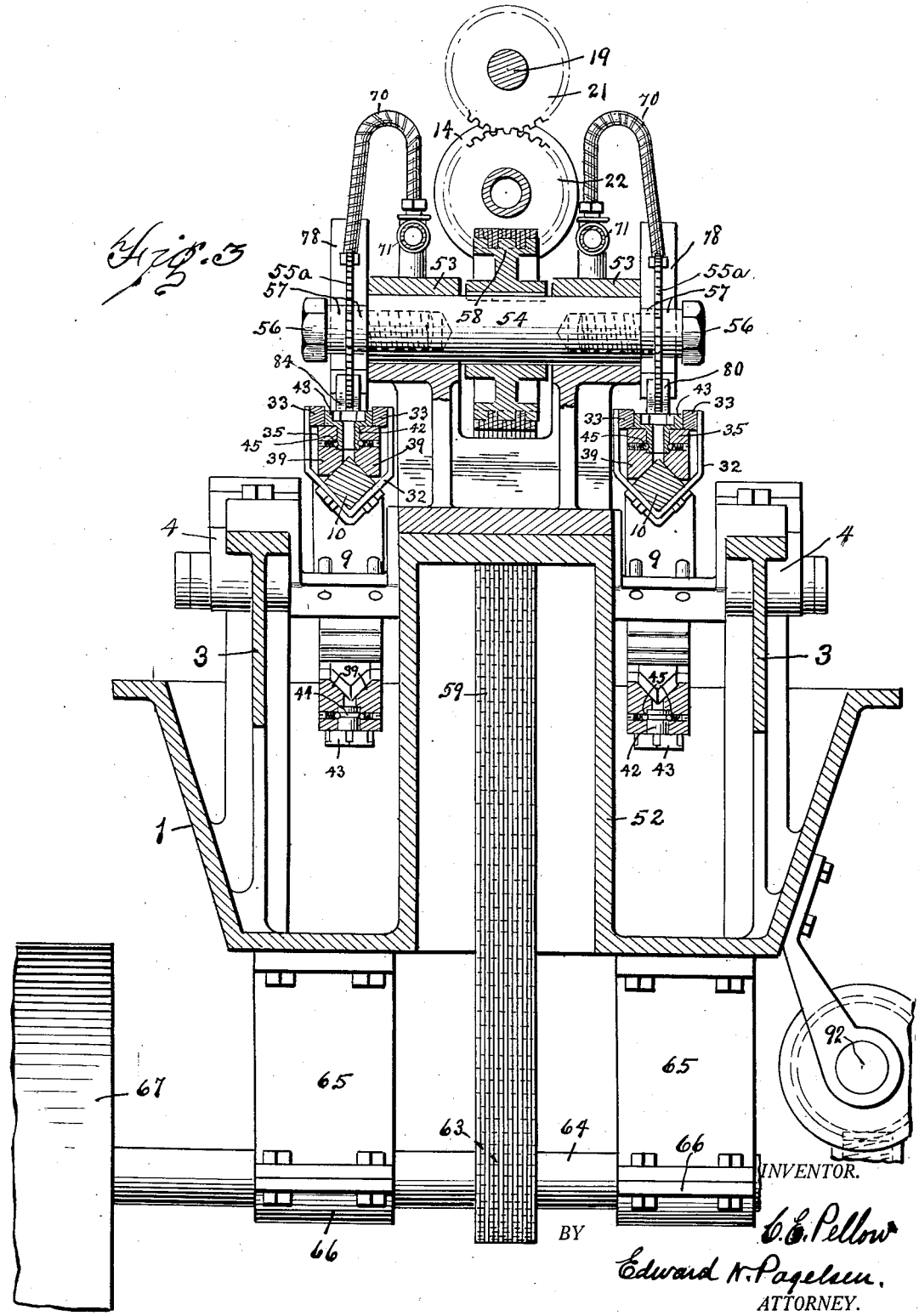

In the accompanying drawings, Fig. 1 is a side elevation of this improved castellating machine. Fig. 2 is a plan thereof. Fig. 3 is a vertical section on a larger scale on the line 3—3 of Fig. 1. Fig. 4 is a plan of the carrier-chain guide. Fig. 5 is a perspective view of one of the links of the carrier-chain. Fig. 6 is a perspective view of a nut socket. Fig. 7 is a diagram of the drive-chain. Fig. 8 is a detail of the mechanism for controlling the depth of the cuts of the saws. Fig. 9 is an elevation of the fingers for holding down the nuts and of the case for these fingers with the cover of the case removed, as seen from the line 9—9 of Fig. 2. Fig. 10 is a perspective view of one of these fingers.

Similar reference characters refer to like parts throughout the several views.

This machine comprises a bed on which three saw supporting shafts are rotatably mounted, a pair of carrier-chains and devices thereon to receive the nuts to be castellated, means to turn the nuts between the operations of the saws thereon, and means to actuate the several parts. The saws and carrier-chains are in duplicate as a single operator can readily position nuts in two chains but the number of such sets of saws and chains can be increased or diminished as desired.

The base 1 is in the form of a trough with closed ends to prevent waste of the liquid which flows onto the saws to facilitate cutting. It is supported on legs 2 and the side bars 3 support the bearings 4 for the head shaft 5 of the carrier-chains, the brackets 6 and 7 supporting the drive shaft 8 for the said chains, and the brackets 9 supporting the square bars 10 on which the carrier-chains are slidable. On the head shaft 5 are mounted the sprocket wheels 11 and the main driving gear 12, preferably a worm gear meshing with the worm 14 which is loose on the drive shaft 8. One end of the worm is formed with clutch teeth 15 adapted to mesh with the teeth 16 on the collar 17 which is splined on this drive shaft and is slidable thereon by means of a fork 18 held between collars 13 on a control shaft 19. This control shaft is slidable in the brackets 6 and 7 and also rotatable by the hand wheel 20. A gear 21 on this control shaft may be slid into mesh with the gear 22 attached to the worm 14 so that the drive shaft may be turned by hand or by means of the belt 23 on the pulley 24 as may be desired.

The tail shafts 26 of the carrier-chains are mounted in frames 27 carrying bearings 28 therefor and mounted on a transverse shaft 29 carried by the bed. The tension of the chains is determined by the screws 30 mounted in the ends of the side bars 3, as shown in Fig. 1. The sprocket wheels 31 are attached to this tail shaft.

The carrier-chains are slidable on the square bars 10 whose ends turn down as shown in Fig. 1. Brackets 32 are attached to these bars 10 and carry the gibs 33 which prevent the nut carriers from turning as hereafter explained. The lower portion of the carrier-chains need not be supported. The chains are made up of links 35 comprising perforated ears 36 to receive the pins 37 which extend through the noses 38 of the next adjacent links which fit between the ears 36. The teeth 39 extend down and are formed with notches to fit on the guide bars 10 as shown in Fig. 3. Each link is formed with a cylindrical socket 41 to receive the stem 42 of a hexagonal nut socket 43 and the stem of this socket is formed with a groove 44 to receive the spring pressed balls 45 (Fig. 3) by which the socket is prevented from falling out of the link.

Each socket is formed with notches 46 to receive the pins 47 (Fig. 4) extending from the gibs 33 which are spaced apart just sufficiently to permit these sockets 43 to slide between them except at points preferably midway between the saws, where the gibs are cut out at 48. The pins 47 are mounted at the middle points of these recesses and engage in the notches 46 in the sockets and rotate the sockets one-sixth of a turn, as indicated in Fig. 4. Two of these turning devices are provided for each chain. Each socket is provided with a recess 50 to hold a nut A and separate sockets are provided for each size of nut.

The saws.

Formed on the base 1 is a central table 52 (Fig. 3) on which are mounted the bearings 53 for the three saw shafts 54 on the ends of which are secured the saws 55, 55$^a$ and 55$^b$ by means of screws 56 and collars 57. On these shafts are the chain gears 58 which receive the drive chain 59 which also passes around the idlers 60 mounted on short shafts 61 carried by bearings 62 mounted to slide in guides 77 (Fig. 1) in any desired manner, the guides being mounted on this central table 52. This construction is well known in the arts and need not be more clearly described, particularly as any other desired means may be employed to drive these saws. The chain 59 also passes around the chain gear 63 mounted on a shaft 64 carried by the brackets 65 and bearings 66 attached to the bottom of the base and a pulley 67 and belt 68 may be used to drive this shaft and the saws.

In order to keep the saws cool and to facilitate cutting a proper liquid may be discharged onto each saw by means of a flexible hose 70 attached to a pipe 71 which connects to any desired source of supply.

The nut retainers.

A shield 75 extends over the front end of the machine to protect the operator and an apron 76 is adapted to receive the nuts to be castellated. The operator drops them into the recesses 50 as the sockets 43 pass out from under this shield and they pass to the first saw 55$^b$ which cuts the groove B into the nuts (Fig. 4). In order to prevent the saw from throwing these nuts out of the sockets, a holding device or retainer is mounted adjacent each saw, three on each side, supported by brackets 77$^a$ attached to the bearings of the shafts of the saws. A flat case 78 (Fig 9) is formed of two parts secured together by means of screws 79 and constitutes guides for the bifurcated fingers 80, 80$^a$ and 80$^b$ which are inclined to the carrier-chain and have inclined surfaces to engage the nuts in the sockets 43.

The adjacent saw extends between the sides of the fingers so that the nut receives pressure on both sides of the saw. These fingers are forced down by the springs 82 which are tensioned by the screws 83 mounted in the end of the case. The finger 80 may be formed with an inclined lip 84 which assists the nut getting under this finger, and other fingers are formed with lips 84$^a$ which extend between the sides of the finger just above, for the same purpose. It will be noticed that the angle between the upper surfaces of the fingers and the line of the chain and therefore of the tops of the nuts is about thirty degrees. The upward pressure of the nuts against the ends of the fingers caused by the teeth of the saws is substantially at right angles to this inclined surface so that the rigid cases 78 take this pressure. The springs 82 merely adjust the fingers and take very little pressure from the nuts. The reason for using three of these fingers is that the nuts on the chain are quite close together and they may vary slightly in height and three fingers furnish an even pressure to these nuts as they pass under the saws. The hose 70 may be attached to the case so that the liquid will be directed to the saw by these fingers. The fingers are prevented from escaping from the case by the small pins 85 at their upper ends which are slidable in the slots 90 in the case.

When a machine is to be used for nuts of different heights or for cutting grooves of different depths, the guide bars 10, instead of being mounted on rigid brackets, may be adjustably mounted as shown in Fig. 8. An arm 86 is attached to each end of each bar and is slidable on parallel inclined pins 87 carried by a bracket 88 attached to the side bar 3. A screw 89 is also mounted in this bracket and threaded in this arm so that the arm and the adjacent end of the guide bar can be moved up or down. It is apparent that when so constructed a two-chain machine can be used to castellate two different sizes of nuts at the same time.

The shaft 64 operatively connects to the shaft 92 in any desired manner, preferably by helical gearing (not shown) and the shaft 92 carries a double pulley 93—94, the belt 23 running on the pulleys 93 and 24 to drive the shaft 8 and the belt 95 running on the pulley 94 and the pulley 96 which actuates the pump 97 which connects to the pipes 71 by means of the hose 98. This pump draws the liquid used to facilitate cutting from the adjacent hollow leg 2 connecting to the tank-like interior of the bed 1.

The details of construction and the proportions of the parts may all be changed by those skilled in the arts without departing from the spirit of my invention as set forth in the following claims.

I claim:—

1. In a castellating machine, a series of saws, all in the same plane, an endless chain passing below the saws and formed of links each having a cylindrical hole at right angles to the upper surface of the chain, a guide to support the chain, nut carriers rotatably mounted on the links of the chain and formed with recesses to receive the nuts and with stems extending into the holes in the links, and means to turn the carriers between the saws.

2. In a castellating machine, a series of saws, all in the same plane, an endless chain passing below the saws and formed of links, a guide to support the chain, nut carriers rotatably mounted on the links of the chain and formed with recesses to receive the nuts, means to turn the carriers between the saws, a frame at each saw, and a group of spring held fingers slidable within each frame to press down the nuts while being acted upon by the saws.

3. In a castellating machine, a series of saws, all in the same plane, an endless chain passing below the saws and formed of links, a guide to support the chain, nut carriers rotatably mounted on the links of the chain and formed with recesses to receive the nuts, means to turn the carriers between the saws, a frame at each saw, and a group of bifurcated spring held fingers slidable within each frame at an oblique angle to the plane of the chain to press down on the nuts on each side of the saw while being acted upon by the saw.

4. In a castellating machine, a series of saws, all in the same plane, an endless chain passing below the saws and formed of links, a guide to support the chain, nut carriers rotatably mounted on the links of the chain and formed with recesses to receive the nuts, means to turn the carriers between the saws, a frame at each saw, a group of bifurcated spring held fingers slidable within each frame at an oblique angle to the plane of the chain to press down on the nuts on each side of the saw while being acted upon by the saw, and a conduit connected to each frame to deliver a liquid thereto to facilitate the action of the saw, said liquid flowing to the saw between the sides of said bifurcated fingers.

5. In a castellating machine, a series of saws, all in the same plane, an endless chain passing below the saws and formed of links, a guide to support the chain, nut carriers rotatably mounted on the links of the chain and formed with recesses to receive the nuts, means to turn the carriers between the saws, a frame at each saw, and a group of bifurcated spring held fingers slidable within each frame at an oblique angle to the plane of the chain to press down on the nuts on each side of the saw while being acted upon by the saw, the lower ends of the fingers at their upper sides being formed with turned-up lips to facilitate the passage of the nuts beneath them.

6. In a castellating machine, a series of saws, all in the same plane, an endless chain passing below the saws and formed of links, a guide to support the chain, nut carriers rotatably mounted on the links of the chain and formed with recesses to receive the nuts, means to turn the carriers between the saws, said guide being formed with inclined sides and the links being formed with gear teeth on their lower sides notched to fit said guides, and sprocket gears to actuate said chain.

7. In a castellating machine, a series of saws, all in the same plane, an endless chain passing below the saws and formed of links, a guide to support the chain, nut carriers rotatably mounted on the links of the chain and formed with recesses to receive the nuts, and means to turn the carriers between the saws comprising parallel guides cut out at the points where the carriers are to be turned and a pin projecting into the path of the carriers from one of said guides at the cut out point, said carriers being polygonal and fitting between the guides and notched to receive the pin to be turned thereby.

8. In a castellating machine, a series of saws, all in the same plane, an endless chain passing below the saws and formed of links, a guide to support the chain, nut carriers rotatably mounted on the links of the chain and formed with recesses to receive the nuts, means to turn the carriers between the saws, said guide being formed with inclined sides and the links being formed with gear teeth on their lower sides notched to fit said guides, sprocket gears to actuate said chain, and means to adjust the distance between said guide and the saws.

9. In a castellating machine, a series of saws, all in the same plane, an endless chain passing below the saws and formed of links, a guide to support the chain, nut carriers rotatably mounted on the links of the chain and formed with recesses to receive the nuts, means to turn the carriers between the saws, a frame at each saw, and a group of bifurcated spring held fingers slidable within each frame at an oblique angle to the plane of the chain to press down on the nuts on each side of the saw while being acted upon by the saws, said angle being such that the upward pressure of the nuts against the lower ends of the fingers under the cutting force of the saw is substantially at right angles to the upper inclined surfaces of the fingers.

10. In a machine for machining metal parts, the combination of a rotatable cutter, a work carrier adapted to move the work along the face of the cutter, a frame at the cutter and a series of fingers one behind the other in the plane of the cutter and slidable within the frame at an oblique angle to the line of movement of the work to hold the work on the carrier.

11. In a machine for machining metal parts, the combination of a rotatable cutter, a work carrier adapted to move the work along the face of the cutter, a frame at the cutter and a series of fingers one behind the other in the plane of the cutter and slidable within the frame at an oblique angle to the line of movement of the work and engaging the work at each side of the face of the cutter.

CHARLES E. PELLOW.